United States Patent
Bauer et al.

(10) Patent No.: US 10,544,847 B2
(45) Date of Patent: Jan. 28, 2020

(54) LINEAR DAMPER WITH AXIALLY OFFSET FRICTION PAD

(71) Applicant: SUSPA GmbH, Altdorf (DE)

(72) Inventors: Michael Bauer, Freihung (DE); Michael Weder, Nuremberg (DE); Andreas Pelczer, Unterrieden (DE); D. Stuart Atwater, Grand Rapids, MI (US); James Lee Vander Zanden, Grand Haven, MI (US); Jonathan David Bruin, Grand Rapids, MI (US)

(73) Assignee: Suspa GmbH (DE)

( * ) Notice: Subject to any disclaimer, the term of this patent is extended or adjusted under 35 U.S.C. 154(b) by 0 days.

(21) Appl. No.: 15/746,226

(22) PCT Filed: Jul. 20, 2016

(86) PCT No.: PCT/US2016/043078
§ 371 (c)(1),
(2) Date: Jan. 19, 2018

(87) PCT Pub. No.: WO2017/015331
PCT Pub. Date: Jan. 26, 2017

(65) Prior Publication Data
US 2018/0231089 A1   Aug. 16, 2018

Related U.S. Application Data (60) Provisional application No. 62/194,379, filed on Jul. 20, 2015.

(51) Int. Cl.
*F16F 7/09* (2006.01)
*D06F 37/24* (2006.01)
*F16F 13/00* (2006.01)

(52) U.S. Cl.
CPC ............ *F16F 7/09* (2013.01); *D06F 37/24* (2013.01); *F16F 13/005* (2013.01)

(58) Field of Classification Search
CPC ........ F16F 7/09; F16F 7/04; F16F 7/08; F16F 7/082; F16F 9/057; F16F 9/3235;
(Continued)

(56) References Cited

U.S. PATENT DOCUMENTS 2,703,156 A * 3/1955 Depallens ............... B60G 13/04
188/129
3,070,193 A * 12/1962 Depallens ................. F16F 7/09
188/129
(Continued)

FOREIGN PATENT DOCUMENTS

DE         29720092      3/1998
WO        2014158493    10/2014

OTHER PUBLICATIONS

Federal Institute of Industrial Property, Moscow, Russia; International Search Report; dated Oct. 5, 2016.

*Primary Examiner* — Robert A. Siconolfi
*Assistant Examiner* — San M Aung
(74) *Attorney, Agent, or Firm* — Price Heneveld LLP (57) ABSTRACT

A damper includes a housing with at least one axially offset longitudinally extending guide channel for receiving a plunger of a piston assembly. The plunger is axially offset from a control rod extending through the housing and the piston assembly. A coil spring surrounds the housing and extends between a hemispherical cap of the housing and the piston. The plunger includes a friction pad which engages the guide channel of the housing to provide frictional inter-engagement for the damper. In one embodiment, the housing includes a pair of axially offset guide channels and the piston assembly includes a pair of axially offset plungers which extend within a pair of guides of the housing. One of (Continued)

the plungers includes a linear sensor which provides signal information for use by a washer control circuit.

24 Claims, 13 Drawing Sheets

(58) Field of Classification Search
CPC ...... F16F 13/005; F16F 37/20; F16F 2222/06;
D06F 37/20; D06F 37/24; B62D 5/006;
Y10T 29/49865; Y10T 403/48
USPC ................ 188/381, 289, 266.1; 267/196
See application file for complete search history.

(56) References Cited

U.S. PATENT DOCUMENTS

| | | | |
|---|---|---|---|
| 4,650,166 A | 3/1987 | Warmuth | |
| 5,946,946 A * | 9/1999 | Sharp | D06F 37/20 |
| | | | 188/129 |
| 7,243,763 B2 | 7/2007 | Carlson | |
| 8,640,837 B2 | 2/2014 | Peuker et al. | |
| 2003/0217901 A1* | 11/2003 | Carlson | F16F 7/08 |
| | | | 188/267 |
| 2004/0084259 A1* | 5/2004 | Carlson | B62D 5/006 |
| | | | 188/164 |
| 2007/0278727 A1* | 12/2007 | Peuker | F16F 7/09 |
| | | | 267/196 |
| 2008/0264744 A1* | 10/2008 | Atwater | F16F 7/09 |
| | | | 188/381 |

* cited by examiner

LINEAR DAMPER WITH AXIALLY OFFSET FRICTION PAD

CROSS-REFERENCE TO RELATED APPLICATIONS

This application claims priority under 35 U.S.C. § 119(e) and the benefit of U.S. Provisional Application No. 62/194,379 entitled Linear Damper with Axially Offset Guides for Plungers with Insert Friction Pads, filed on Jul. 20, 2015, by Michael Bauer, et al., the entire disclosure of which is incorporated herein by reference. This application is a national phase entry of PCT Patent Application Serial Number PCT/US2016/0403078, filed Jul. 20, 2016 (now pending) designating the United States of America.

BACKGROUND OF THE INVENTION

The present invention relates to dampers for use in connection with washing machines.

Dampers for washing machines typically are enclosed cylindrical members with a spring-loaded piston coupled to a rod extending from the cylindrical body and attached between the cabinet of the washing machine and the drum for the clothing being washed. Typically, the piston includes a damping material and lubrication to provide a frictional interface between the piston and the inner wall of the cylindrical housing. U.S. Pat. No. 7,549,519 discloses an improved version of such a damper in which some movement of the washer drum is allowed before damping occurs. Other examples of dampers employed in a washing machine environment include U.S. Pat. No. 7,445,098, U.S. Publication No. 2003/0183994, and PCT Application No. PCT/IB2015/051190.

One issue with closed cylinder type dampers is that, during extended heavy duty use, the interface between the internal piston of the damper and the inner cylindrical wall of the housing generates a considerable amount of heat and, during an extended period of use, may wear out or reduce the effectiveness of the damper. U.S. Pat. No. 8,640,837 represents a different form of damper in which the non-cylindrical housing is provided with a guide track and a slide containing a friction pad to engage opposite walls of the housing. There remains a need, however, for an improved linear-type damper which has mounting capabilities for positioning in existing washing machine designs, namely, one with a hemispherical cap and extending piston rod, such that it can be coupled to current washing machine designs. It would also be desirable to provide a reliable, long life damper which can largely be molded of a polymeric material with a minimum number of components.

SUMMARY OF THE INVENTION

The damper of the present invention accommodates this need by providing a two-piece housing and piston assembly with the housing including an end cap and at least one guide channel having an axially offset longitudinally extending wall for engaging a friction pad on a plunger of the piston assembly. The plunger is axially offset from a control rod guidably extending through the end cap of the housing. An opposite end of the control rod is coupled to a disk-shaped piston of the piston assembly. A coil spring surrounds the housing and extends between the end cap and the piston. The plunger includes one or more friction pads which engage the wall of the guide channel of the housing to provide the desired frictional inter-engagement for the damper. With such an open architecture for the damper assembly, heat dissipation is largely avoided and the cost of manufacturing the two polymeric members forming the housing and piston assembly is greatly reduced over existing dampers.

In one embodiment of the invention, the housing includes a pair of guide channels with axially offset walls, and the piston assembly includes a pair of axially offset plungers which extend within guide channels of the housing. One of the plungers includes a wall engaging the friction pad while the other includes a linear sensor which provides signal information for use by a washer control circuit providing information as to the movement of the damper. The speed of the washing machine spinning can be controlled using such signals representing the extension and frequency of the damper during washing and spin drying cycles of operation. In other embodiments, single or multiple guide channels are provided with walls engaged by one or more friction pads to provide the desired damping action.

These and other features, objects and advantages of the present invention will become apparent upon reading the following description thereof together with reference to the accompanying drawings.

DETAILED DESCRIPTION OF THE PREFERRED EMBODIMENT

Figure 1:
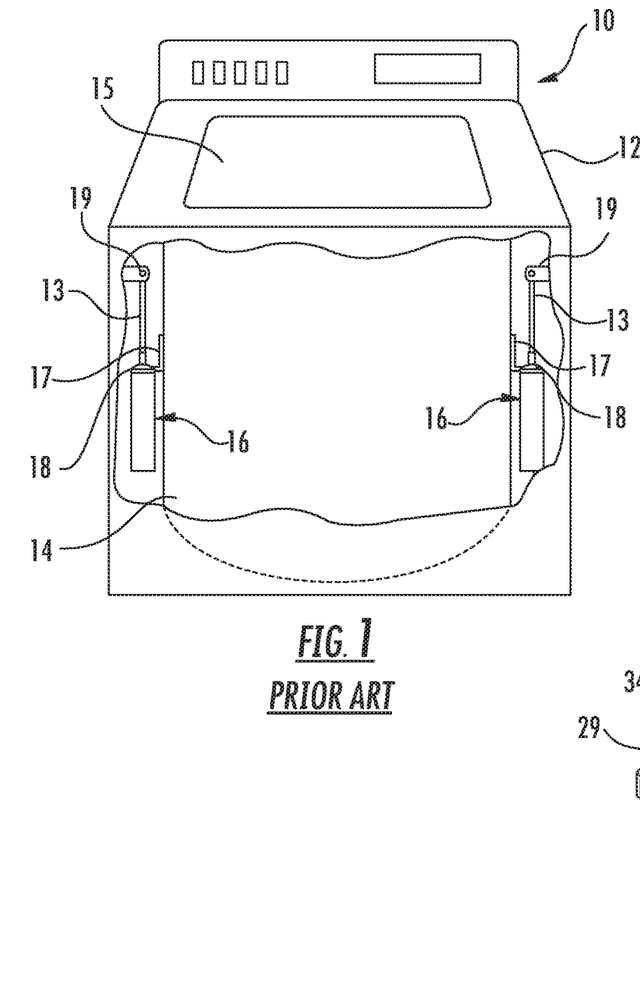
FIG. 1 is a perspective view of a washing machine, shown partly broken away, illustrating the mounting of two conventional dampers.

Referring initially to FIG. 1, there is shown a washing machine 10, which includes a cabinet and frame 12 and a top-loading drum 14 for receiving clothes to be laundered through a hinged cover 15. Drum 14 rotates and agitates the clothes during wash and spin dry cycles and is subject to vibrations during normal operation of the machine, particularly when there are unbalanced loads. Drum 14 is supported by a plurality of prior art dampers 16 (two shown in the pictorial diagram of FIG. 1) at various locations. The dampers are mounted in a tension mode with a bracket 17 secured to the drum 14. The bracket has a concave end surrounding and engaging the hemispherical end cap 18 of damper 16 which includes a control rod 13 extending therefrom. The control rod is secured to the cabinet and frame 12 of the machine by a fixed bracket 19. Typically, four such dampers are employed for suspending the drum 14 within cabinet 12 and provides damping for the washing machine drum 14.

Figure 2:
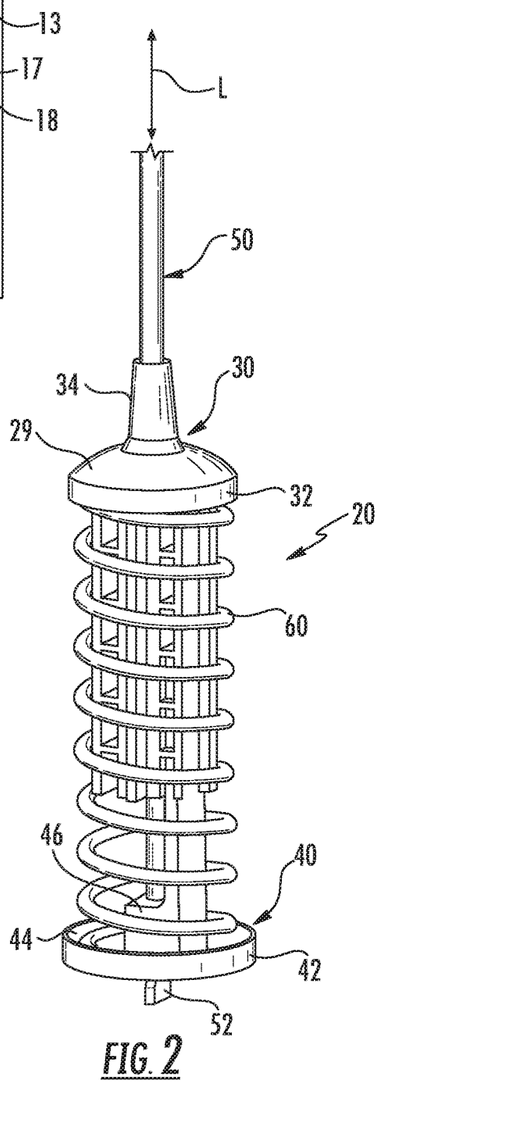
FIG. 2 is a fragmentary perspective view of a new open architecture damper embodying the present invention which can be employed to replace the dampers of the prior art.
Figure 9:
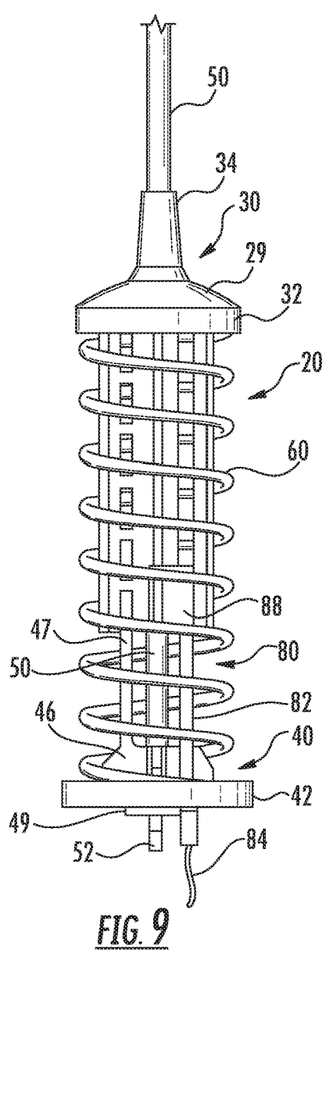
FIG. 9 is a side elevational view of an alternative embodiment of the invention in which a sensor is mounted to the piston assembly on an axis offset from the damper rod.

The prior art dampers 16 shown in FIG. 1 are replaced with the improved open architecture damper 20 of the present invention. By open architecture, it is meant that the damper elements are not housed within a cylindrical chamber but rather are open, as seen, for example, in the assembled views of FIGS. 2, 9, 16, and 18. Dampers 20 of the present invention include a housing 30, a piston assembly 40, and a control rod 50. The control rod extends through the housing along its longitudinal axis and through a circular aperture 48 (FIG. 3) in a disk-shaped piston 42 of the piston assembly. Rod 50 is secured to piston 42 at its lower end by a peened end 52 (FIG. 2). A washer 49 (FIGS. 9 and 12) is positioned between peened end 52 and piston 42. The damper 20 also includes a coil spring 60 which is in compression and extends between the upper hemispherical cap 32 of housing 30 and the inner disk-shaped dish 44 of piston 42.

Figure 3:
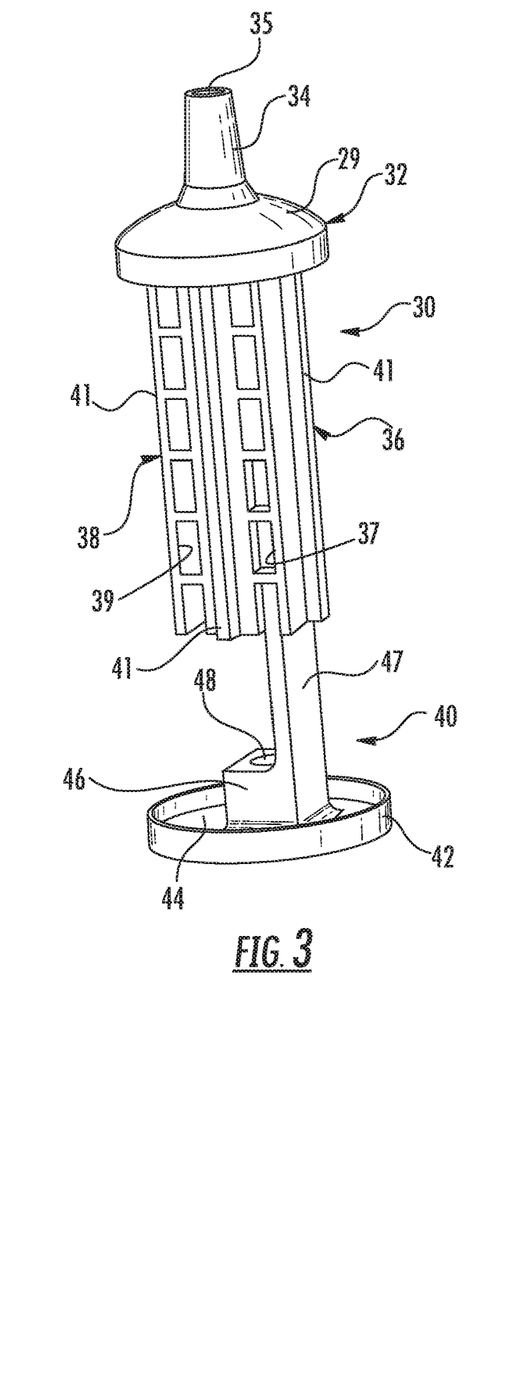
FIG. 3 is a perspective view of the damper housing and piston assembly.
Figure 6:
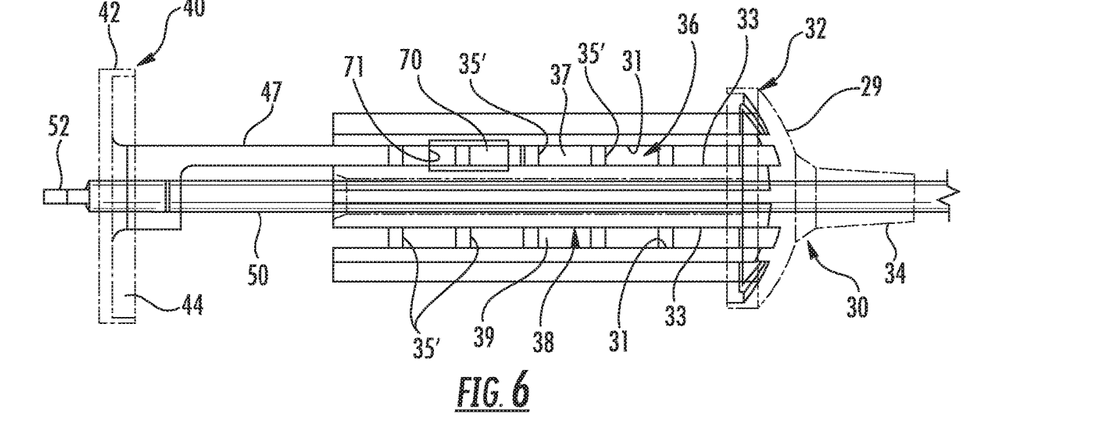
FIG. 6 is a right side elevational view of the assembly shown in FIG. 5.
Figure 7:
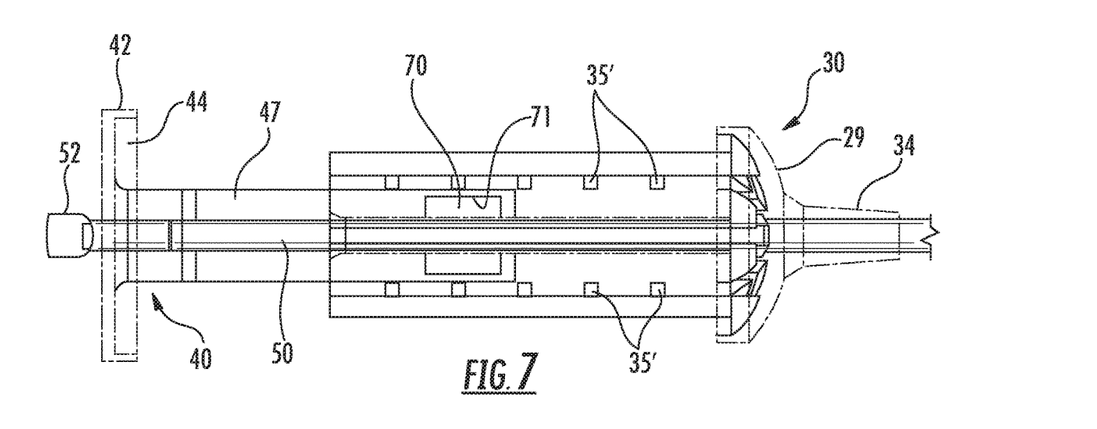
FIG. 7 is a front elevational view of the structure shown in FIG. 6.
Figure 8:
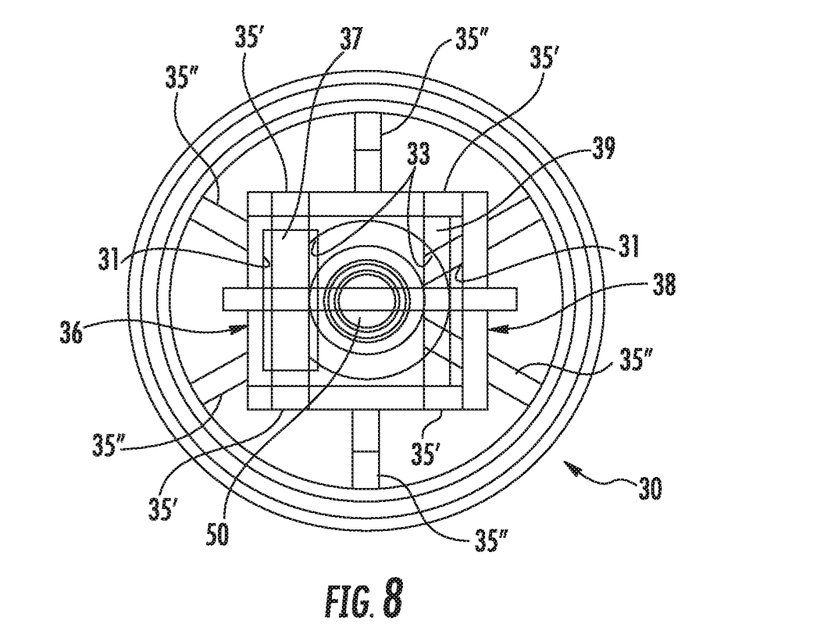
FIG. 8 is a top view of the structure shown in FIG. 7, shown partly in skeletal form.
Figure 12:
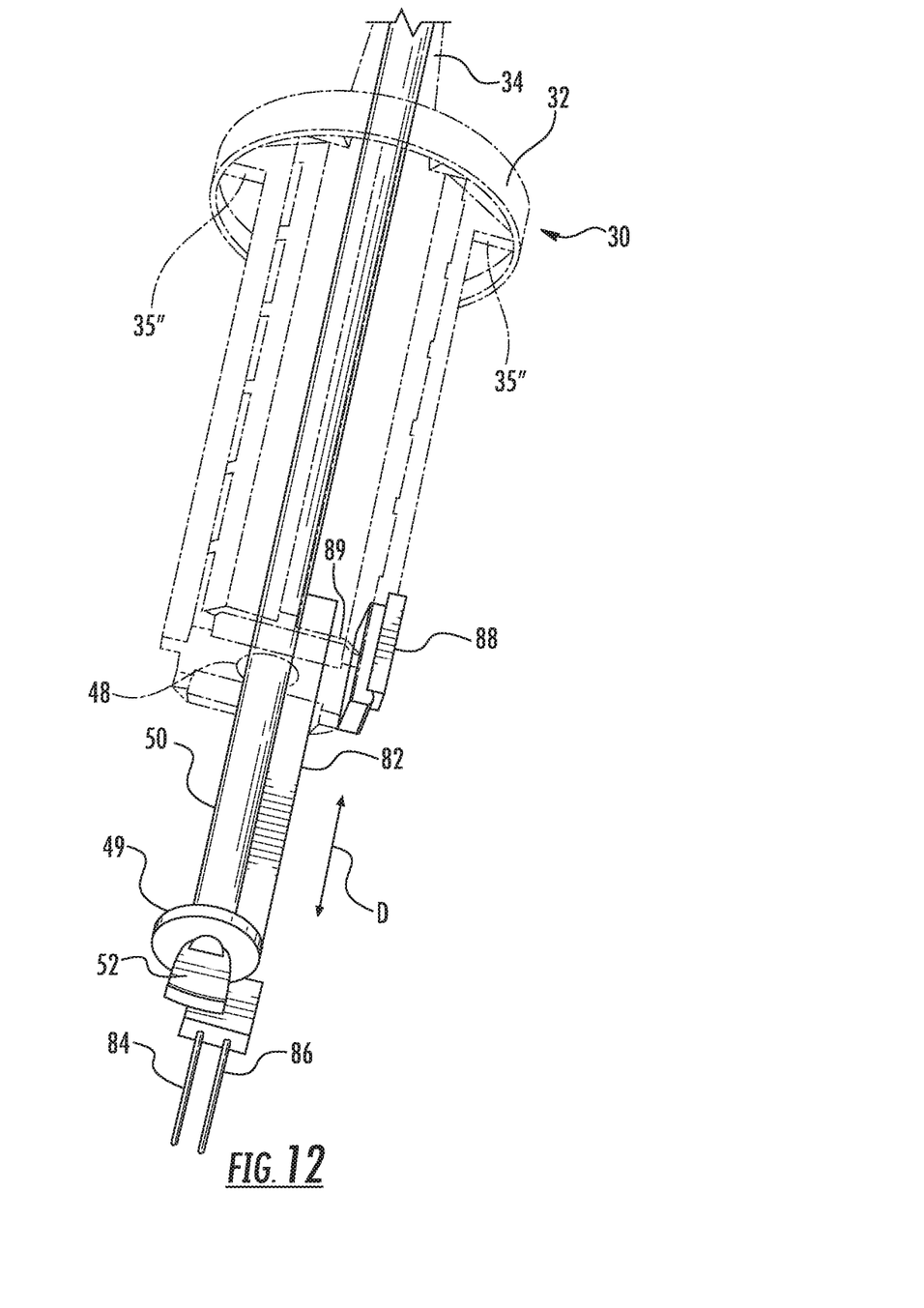
FIG. 12 is a perspective view of the structure of FIG. 9 showing the sensor assembly, the control rod, and the housing in phantom form.

The housing assembly 30 of one embodiment of the invention is best seen in FIGS. 2, 3, and 5-8 and comprises a hemispherical cap 32 having an outer upper surface 29, a conical end 34, and an opening 35 (FIG. 3) through which the control rod 50 freely extends. When mounted to a washing machine 10 such as shown in FIG. 1, the surface 29 mates with mounting bracket 17 to allow the damper 20 to move in the ball-socket type connection. The housing 30 also includes two pairs of axially offset guides 36 and 38, each defining a guide channel 37 and 39, respectively, which are generally rectangular (FIGS. 3, 6, and 8). Guide channel 37 slideably receives a generally rectangular plunger 47 of the piston assembly 40. Guide channels 37 and 39 of the housing assembly 30 are offset from the longitudinal axis (L, FIG. 2) of the damper 20. The relationship of the offset guide channels 37 and 39 of the housing 30 is best seen in FIGS. 6 and 8, with the guide channels 37 and 39 being defined by spaced-apart outer walls 31 and inner walls 33 supported at their ends by cross support ribs 35'. The hemispherical cap 32 is supported by the ends of walls 31 and 33 by radially outwardly extending ribs 35", as best seen in FIGS. 8 and 12. The housing 30 also includes longitudinally extending reinforcing ribs 41 (FIG. 3).

Figure 4:
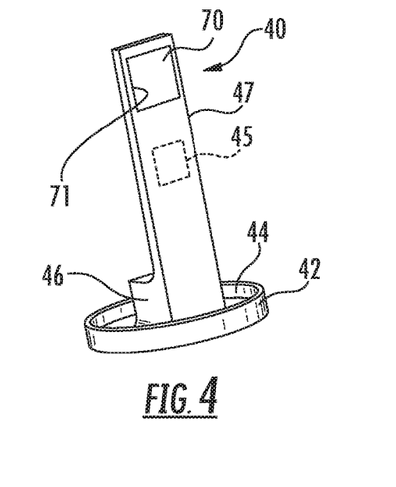
FIG. 4 is a perspective view of the piston assembly.
Figure 5:
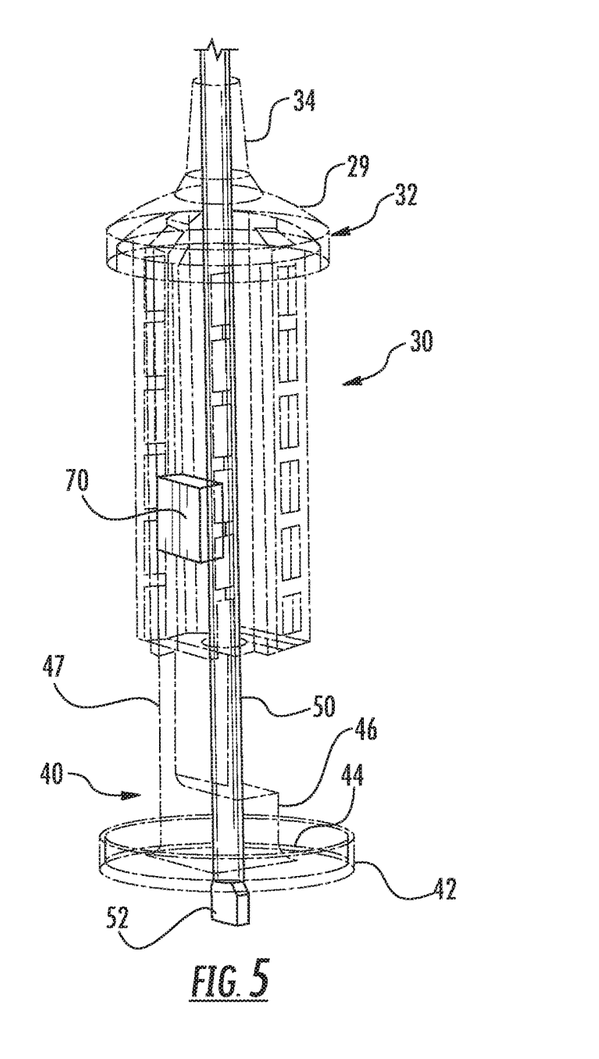
FIG. 5 is an assembled view of the structure shown in FIG. 2 without the spring and shown partly in skeletal form, illustrating the positioning of a foam friction pad as seen in FIG. 4 engaging the wall of the housing guide.

The base of the piston assembly 40 includes a mounting block 46 from which rectangular plunger 47 integrally extends. Block 46 includes a central aperture 48 (FIG. 3) through which the control rod 50 extends, as illustrated in FIGS. 2 and 5-11. Plunger 47 includes a recess or aperture 71 for receiving and supporting a friction pad 70, as illustrated in FIG. 4. The housing 30 and piston assembly 40 are integrally molded of a suitable polymeric material, such as polypropylene, ABS, or the like by injection molding. Thus, the two major components of the damper are integrally molded of polymeric materials. The coil spring 60 is captively held at its upper end in the concave recess of the hemispherical cap 32 of the housing and at its lower end in the disk-shaped dish 44 of the piston 42. During assembly, the control rod is inserted through the opening 35 in the housing cap through the center of the housing 30 and through aperture 48 in the piston and washer 49 and peened over at 52 to complete the assembly.

Figure 13:
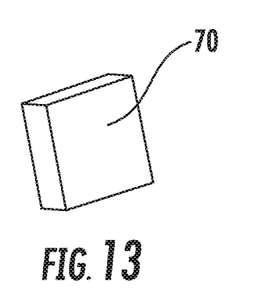
FIG. 13 is a perspective view of a friction pad which can be used in connection with any of the piston assemblies of this invention.
Figure 14:
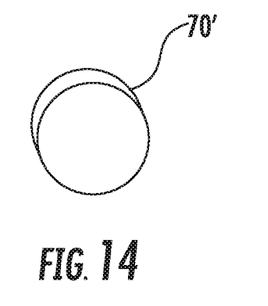
FIG. 14 is a perspective view of a circular friction pad which can be used with any of the dampers of the present invention.
Figure 15:
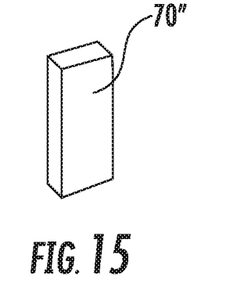
FIG. 15 is a perspective view of a rectangular friction pad which can be used with the dampers of the present invention.

The control rod 50 conventionally includes a hook or other attachment means at its upper end, such that it can be installed on a bracket 19 of a washer, such as illustrated in FIG. 1, placing the spring under compression. The friction pad 70 can take any number of shapes, such as a square pad, as seen in FIG. 13, which extends through a square opening 71 in the plunger 47, as illustrated in FIGS. 6 and 7, to extend on both sides of the guide channel 37 to engage the surfaces of both walls 31 and 33. The pad is made of a closed cell polyurethane foam, which is injected with 2 to 6 cubic centimeters (cc) of suitable grease to provide a lubricious and somewhat frictional interface between the plunger 47 and housing 30. The friction pad 70 is generally square and is force-fitted into the square pad-receiving aperture 71 of the plunger 47. Alternatively, friction pad 70 can take on additional shapes, such as shown at 70' in FIG. 14 as a round or oval shape, or a rectangular shape as shown at 70" in FIG. 15. Additionally, the plunger 47 may have one or more an additional openings 45, as shown in phantom lines in FIG. 4, for additional frictional pads if additional damping is desired. Also, the apertures for receiving the frictional pads may be larger in a longitudinal direction than the pad to allow some free space movement of the damper before damping occurs. Thus, the pad may be 10 mm by 10 mm and fit in an aperture in the plunger that is 10 mm by 15 mm. The friction pad 70 is confined in the space surrounding the pad by the frame of plunger 47 surrounding the pad and confined between the walls 31 and 33 of the guide within the housing so that it is movable with the piston assembly plunger 47 and confined within the guide channels 37, 39 of housing 30 during use of the washing machine.

Figure 16:
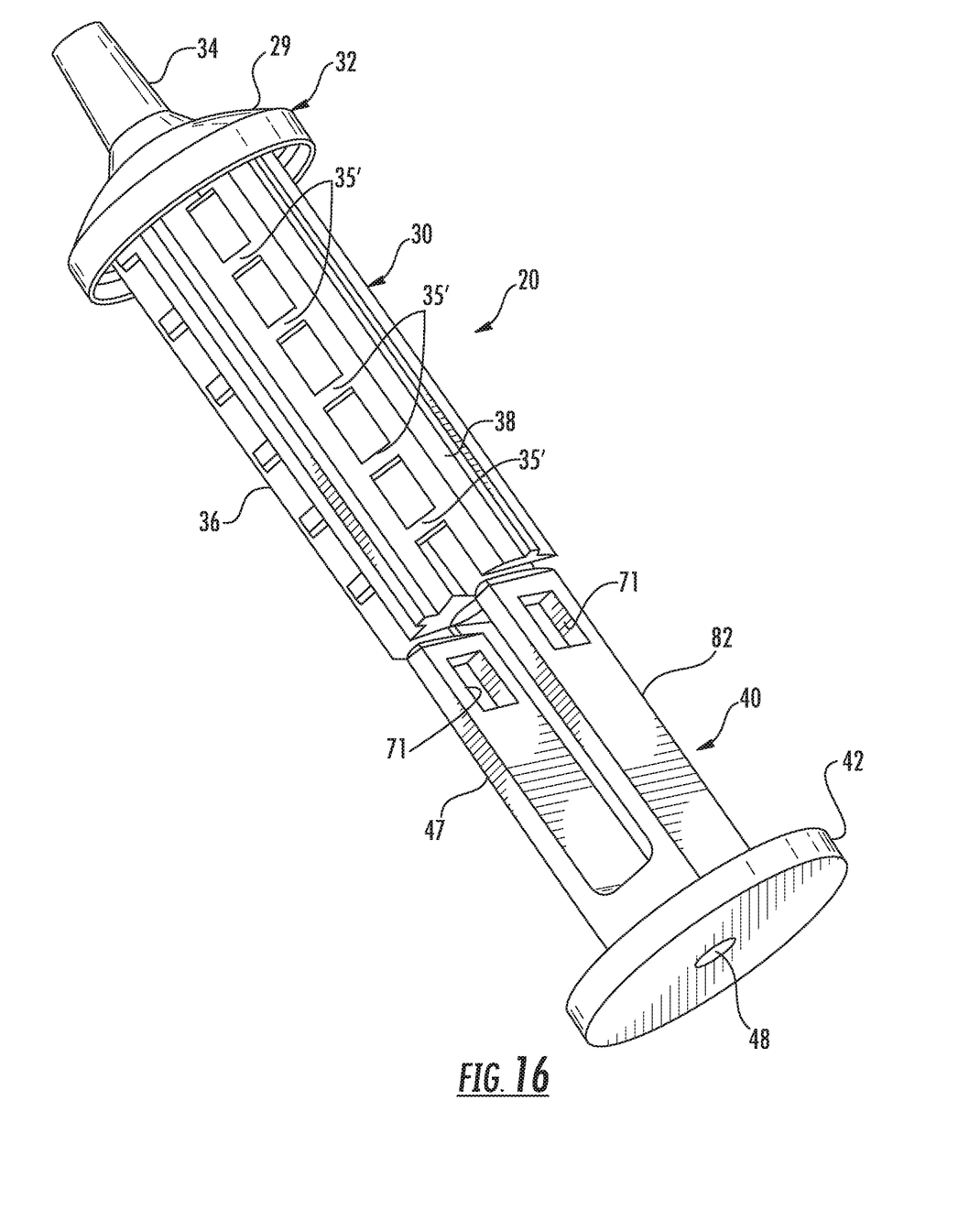
FIG. 16 is a perspective view of an alternative embodiment with the piston assembly including two plungers fitting within a mating housing assembly.
Figure 17:
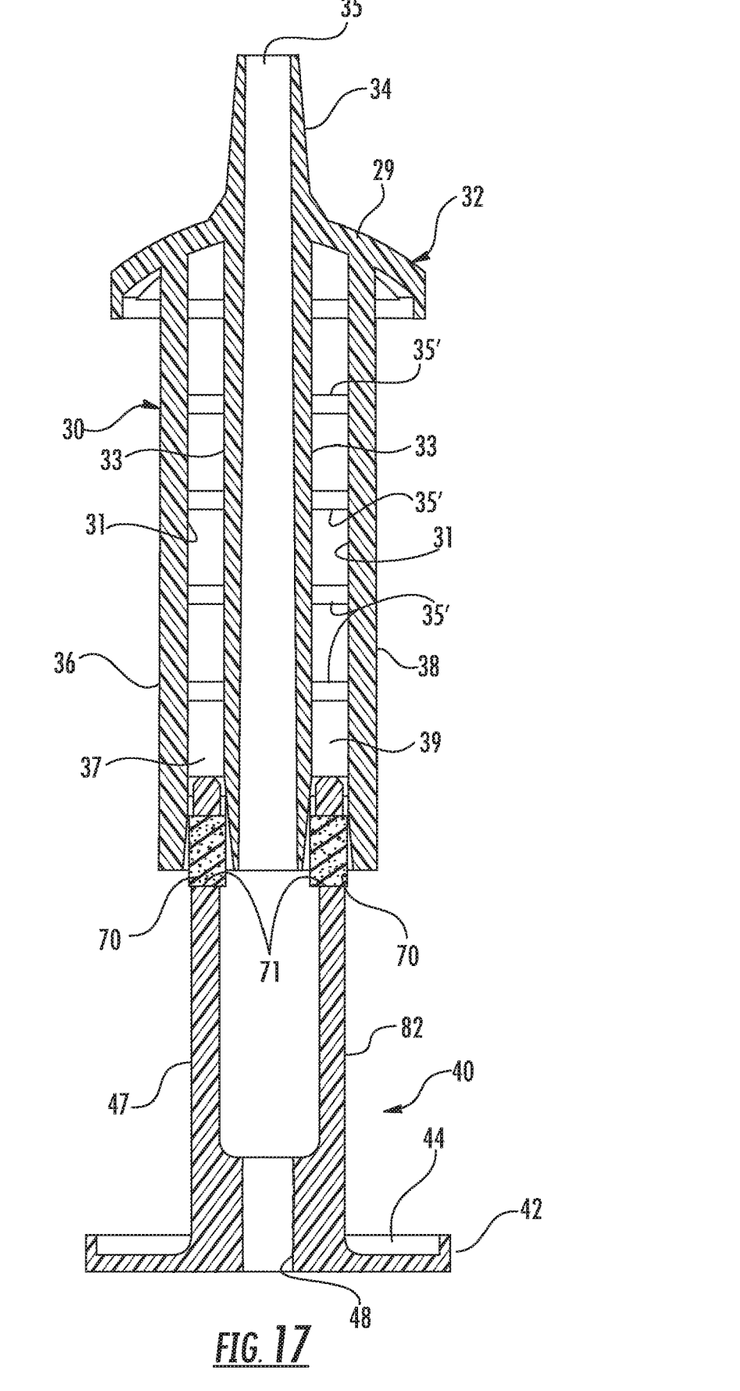
FIG. 17 is a vertical cross-sectional view of the piston and housing assembly of FIG. 16, illustrating the positioning of the friction pad.

Inasmuch as the housing includes a pair of guide channels 37 and 39, a second plunger could be incorporated within the piston assembly, as shown in the embodiment of FIGS. 16 and 17 described below. In an alternative embodiment of the invention as shown in FIGS. 9-12, a motion sensor assembly 80 is included to provide electrical signals to a washer control circuit indicating the frequency and amplitude of motion of the damper 20 during a washing cycle of operation.

Figure 10:
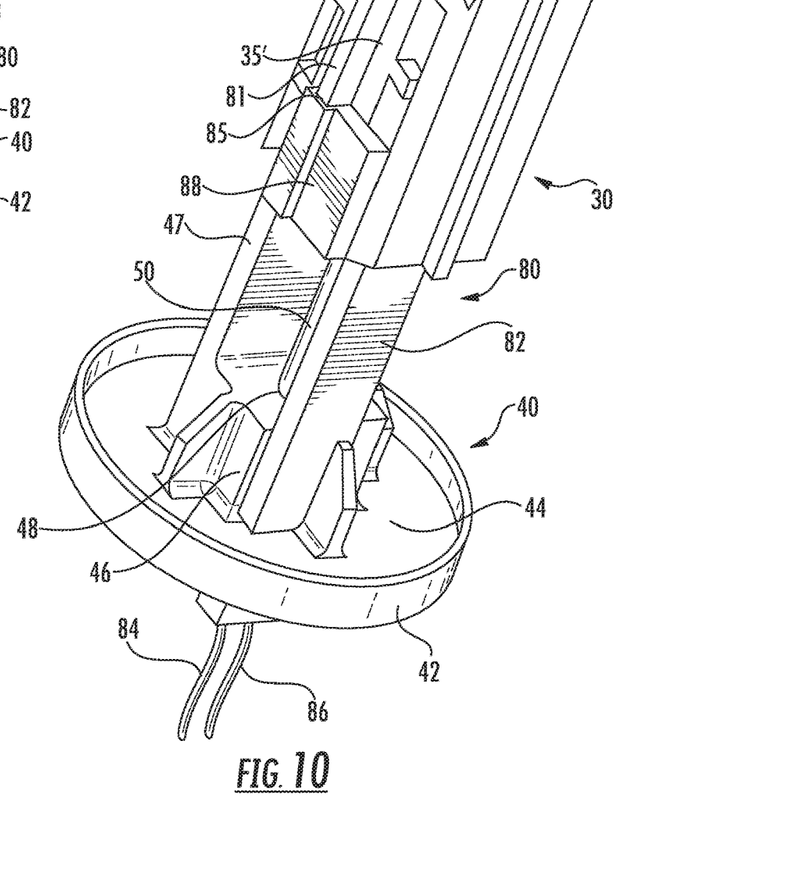
FIG. 10 is an enlarged fragmentary perspective view of the piston, sensor, and housing shown in FIG. 9.
Figure 11:
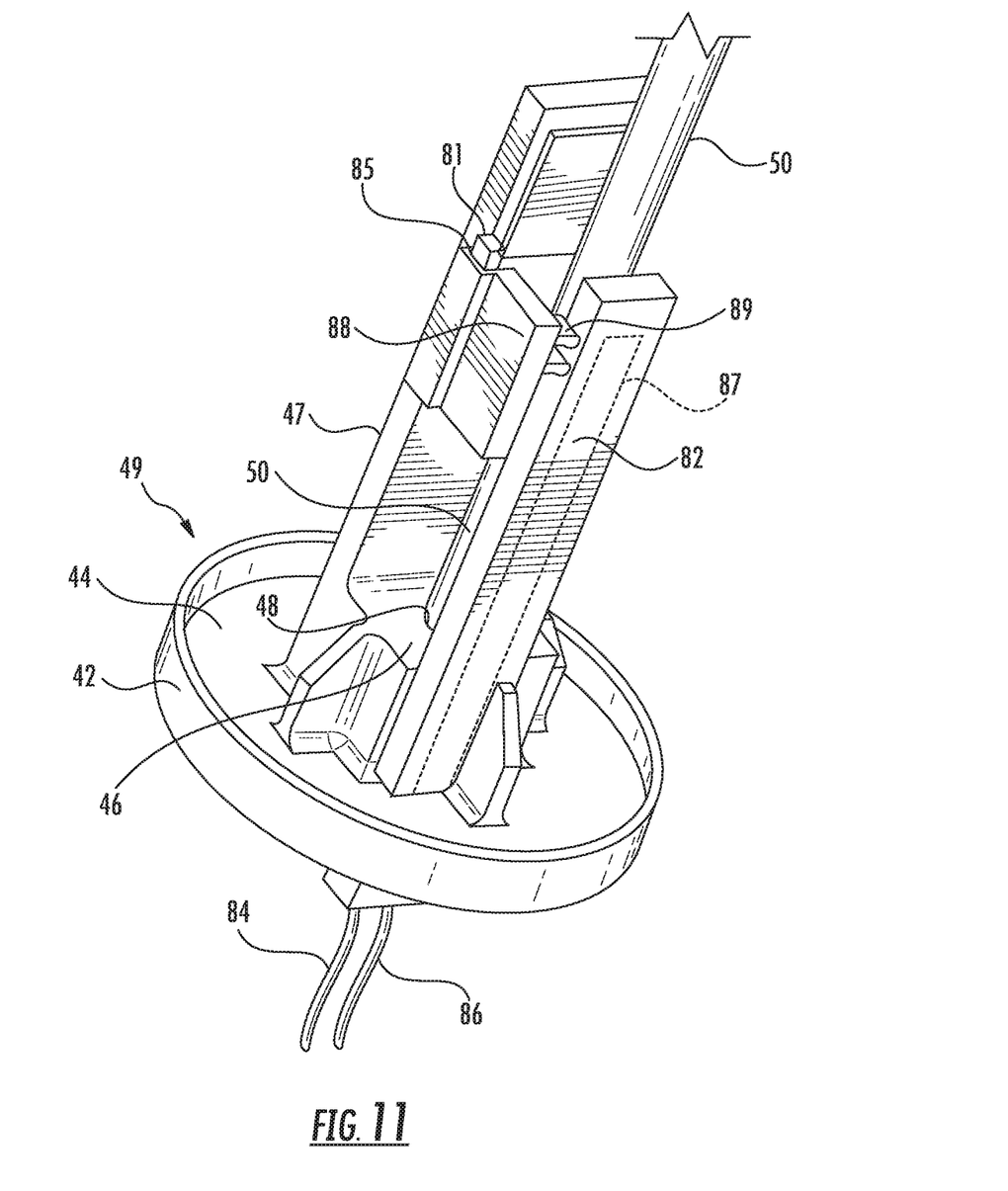
FIG. 11 is a fragmentary perspective view of the piston and sensor shown in FIG. 9.

The sensing assembly 80 comprises any number of different linear sensing devices, such as a hall-effect sensor, capacitive sensor, an inductive sensor, an optical encoder, or an ultrasonic encoder. In the embodiment shown in FIGS. 9-12, mounted to the piston assembly 40 at the base 46 in dish 44 is a mounting slot for holding a longitudinally extending plunger 82 having a coil 87 (shown in phantom form in FIG. 11) embedded therein with electrical wire conductors 84 and 86 extending therefrom. The coil extends along the length of plunger 82 and reacts with a fixed magnet 88 snap-fitted to one of the cross braces 35' by snap-lock socket 89, as best seen in FIG. 11. The magnet is embedded within a polymeric housing, which may further include a stabilizing channel 85 connecting to a rib 81 on the housing assembly 30, as best seen in FIG. 10. As the damper plungers move in the direction indicated by arrow D in FIG. 12 in response to vibratory action of the drum of a washer, the coil contained in plunger 82 moves with respect to the fixed magnet 88 inducing a voltage in the embedded coil 87 which is coupled by conductors 84 and 86 to a suitable control circuit. This will provide the washer control with frequency and amplitude information with respect to the vibratory forces causing the movement of the damper control rod and piston assembly with respect to the housing, thereby indicating the severity of vibrations. The washer control circuit can then change the speed of the rotating drum during, for example, the spin dry cycle to prevent excessive vibrations.

Figure 18:
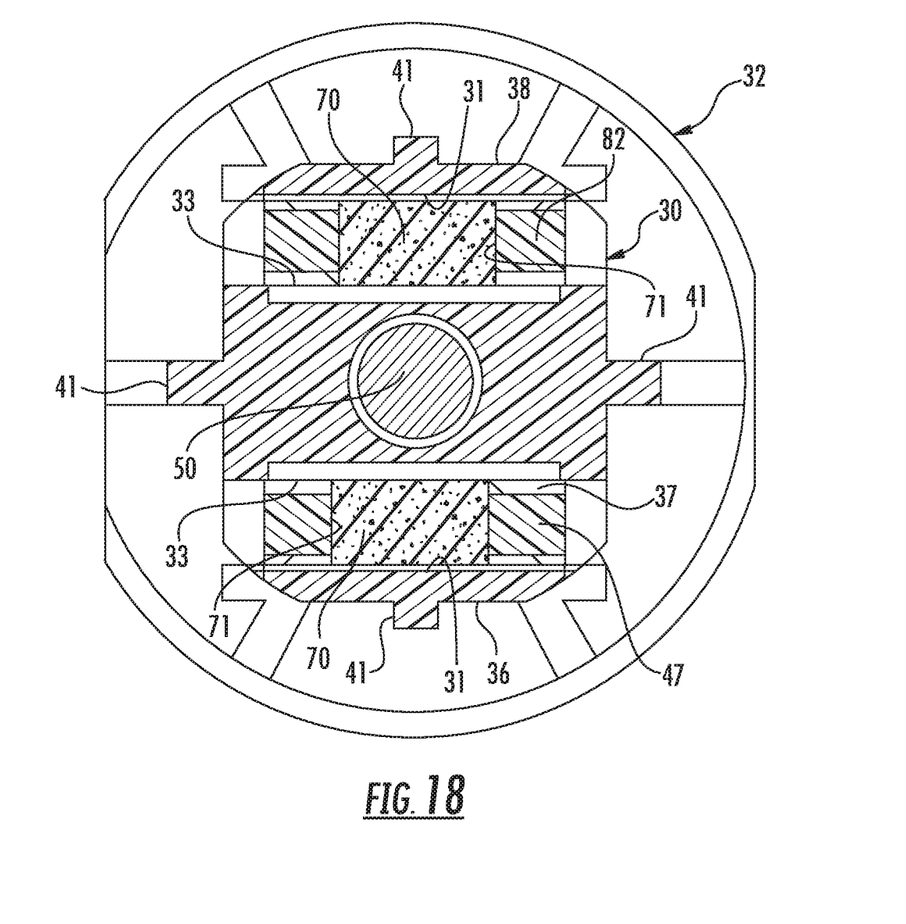
FIG. 18 is a horizontal cross-sectional view of the damper assembly shown in FIG. 16, showing the interrelationship of the first set of friction pads with wall of the guide channel receiving the piston assembly.

FIGS. 16-18 show an alternative embodiment of a damper 20 employing two spaced-apart plungers, each with friction pads to provide balanced offset frictional damping for the damper 20. In the figures, the same components as in the prior embodiments shown in FIGS. 2-15 are identified with the same reference numerals. Not shown is the control rod and spring, which is of the same construction and orientation as in the prior embodiments.

Damper 20 of FIGS. 16-18 includes a plunger 47 and a spaced-apart second plunger 82 integrally molded to the piston 42 which includes an aperture 48 in its base for receiving a control rod. Each of the plungers 47, 82 include a square aperture 71 for receiving a frictional foam polymeric pad 70 (FIG. 17). The damper 20 shown in FIGS. 16-18, therefore, provides a pair of plungers 47 and 82 which ride in guide channels 37 and 39, respectively, with friction pads 70 engaging the outer surfaces 31 of the guide channels on one side and the inner surfaces 33 on the other side to provide a somewhat more robust damper. A sensor assembly, such as 80 shown in FIGS. 9-12, can be incorporated in either one of the plungers 47 or 82 if desired.

Figure 19:
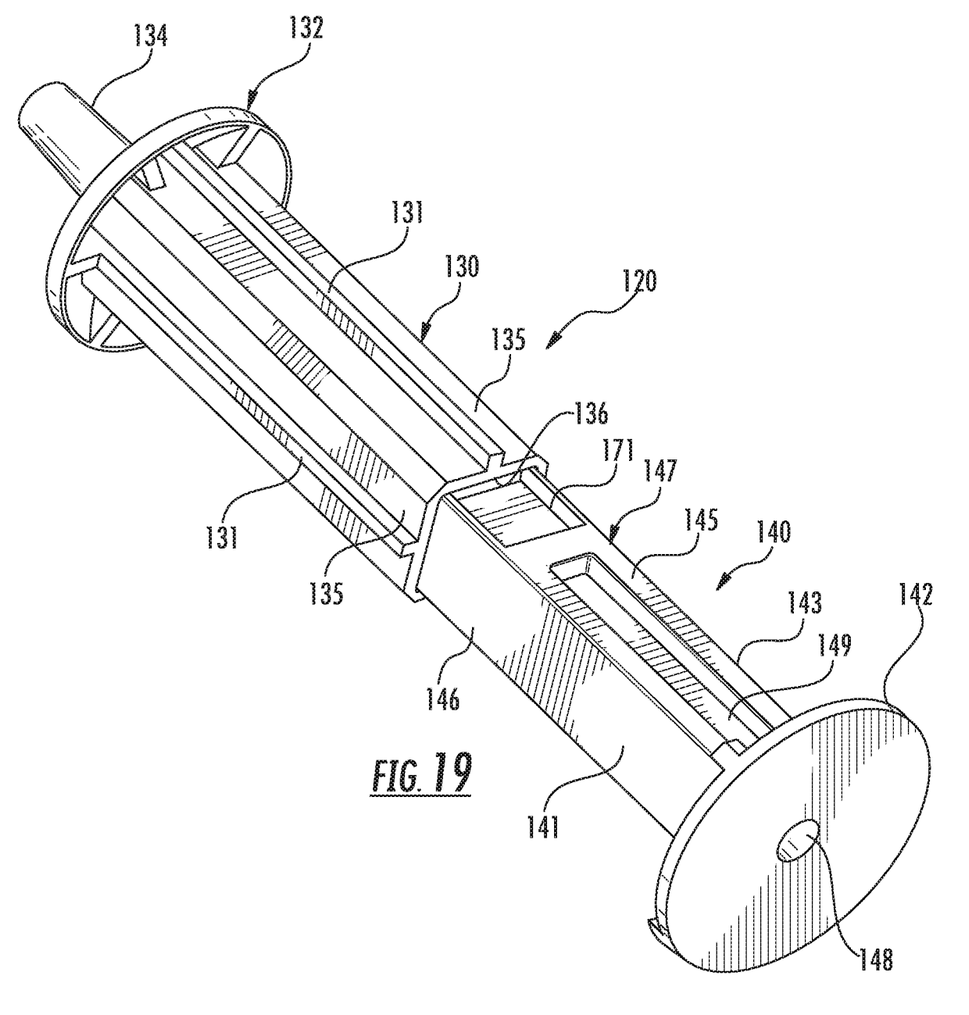
FIG. 19 is a perspective view of an alternative embodiment of the invention in which a piston assembly having a single plunger is employed with opposed friction pad receiving recesses.
Figure 20:
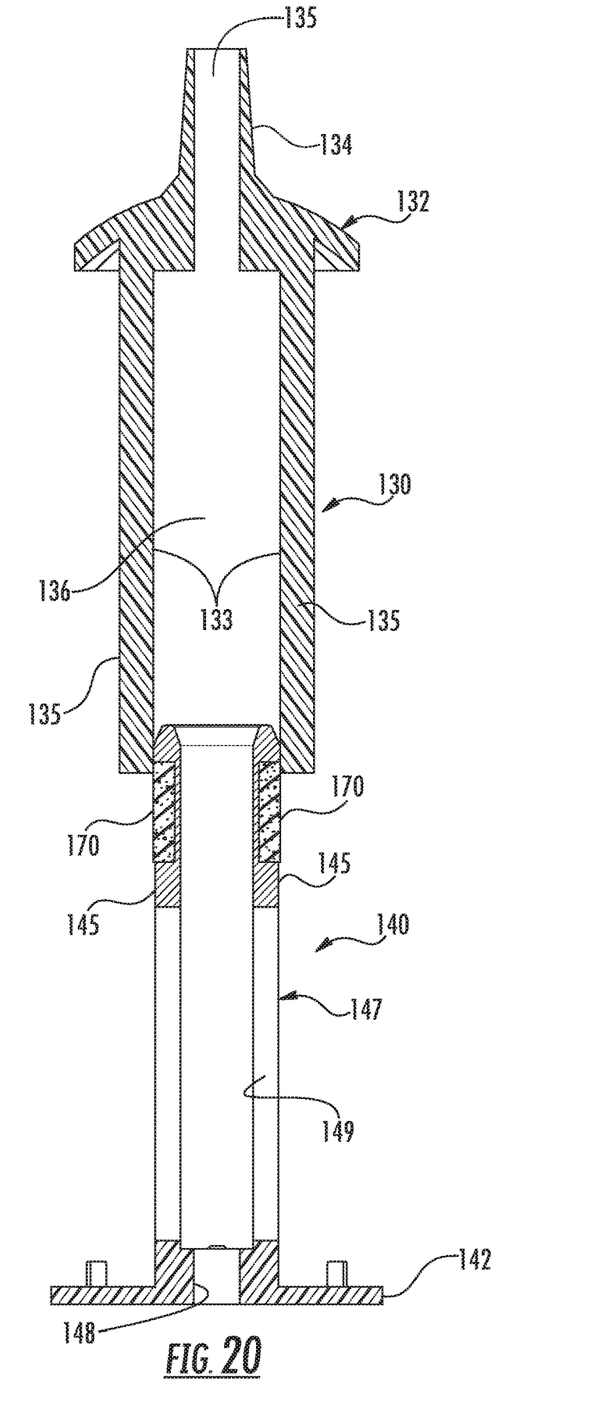
FIG. 20 is a vertical cross-sectional view of the structure shown in FIG. 19.
Figure 21:
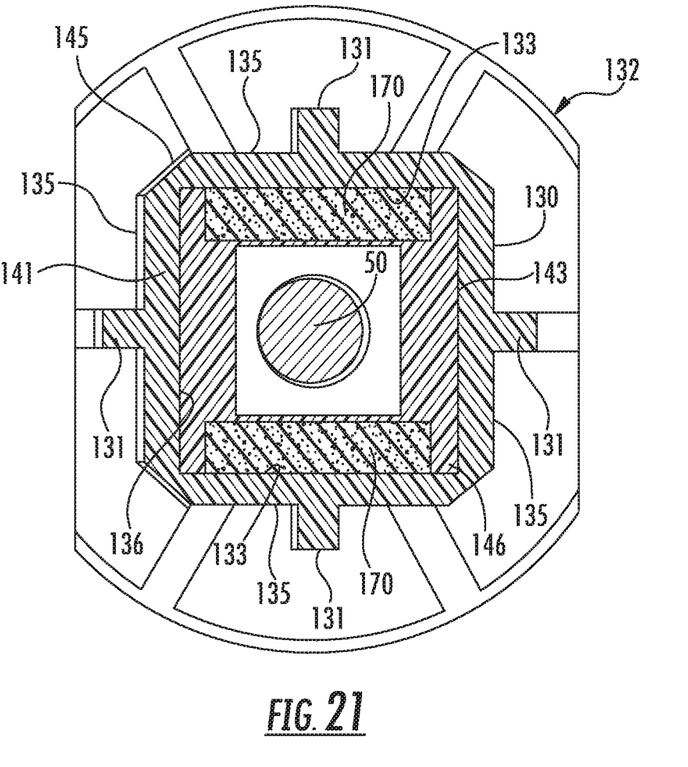
FIG. 21 is a horizontal cross-sectional view of the damper of FIG. 19, showing a second pair of friction pads and the relationship between them and the walls of the guide channel.

In yet another alternative embodiment of the invention, FIGS. 19-21 show a damper 120 having a housing assembly 130 with a generally square guide channel 136 formed by four walls 135, which are integrally formed and include integrally formed reinforcing ribs 131 extending longitudinally along the outer walls defining the square guide channel 136 of the housing assembly 130. The square guide channel 136 is integrally formed with a cap 132 having a conical end 134 for receiving a control rod which extends centrally through the housing assembly and the mating piston assembly 140 and through aperture 148 in the piston 142 for receiving a control rod 50 (FIG. 21) therethrough. Not shown is the spring which is positioned between the cap 132 and piston 142 as in other embodiments.

The damper 120 includes a square hollow piston assembly with a square plunger 147, which rides within the square guide channel 136 of housing 130. Plunger 147 includes end walls 141 and 143 and integrally formed side walls 145 and 146. The side walls 145 of piston assembly 140 include a slot 149 to reduce the amount of material. The side walls include apertures or recesses 171 for receiving friction pads 170, which ride on the inner longitudinally offset walls 133 of the housing 130.

In each of the embodiments, there is provided a damper with at least one guide channel having at least one wall offset from the longitudinal axis of the housing and a piston assembly including a plunger shaped to slideably fit within the guide channel of the housing, and a friction pad mounted to the plunger to frictionally engage at least one wall of the guide channel of the housing.

It will become apparent to those skilled in the art that various modifications to the preferred embodiment of the invention as described herein can be made without departing from the spirit or scope of the invention as defined by the appended claims.

The invention claimed is:

1. A damper for a washing machine, said damper comprising:
   a housing having a longitudinal axis and an end cap with a central aperture for guidably receiving a control rod for said damper, said housing including at least one guide channel having at least one wall offset from said longitudinal axis of said housing;
   a piston assembly including a piston at one end and a plunger extending therefrom and shaped to slideably fit within said guide channel of said housing;
   a friction pad mounted to said plunger to frictionally engage said at least one wall of said guide channel of said housing;
   a control rod extending through said aperture in said end cap of said housing and attached to said piston; and
   a coil spring surrounding said housing and captively held between said end cap of said housing and said piston.

2. The damper as defined in claim 1 wherein said guide channel includes a pair of opposed walls and said plunger includes a pair of friction pads engaging said opposed walls of said guide channel.

3. The damper as defined in claim 1 wherein said piston assembly includes a pair of spaced-apart plungers and said housing includes a pair of spaced-apart guide channels for receiving said plungers, wherein said spaced-apart guide channels each have at least one wall for engaging a friction pad mounted on each of said plungers.

4. The damper as defined in claim 3 wherein each of said spaced-apart guide channels include a pair of opposed walls for engaging said friction pads on said plungers.

5. The damper as defined in claim 1 wherein said guide channel is defined by a pair of spaced-apart walls extending in parallel relationship to said longitudinal axis of said housing.

6. The damper as defined in claim 1 wherein said plunger is a generally flat rectangular member dimensioned to slide between said walls of said guide channel of said housing.

7. The damper as defined in claim 1 wherein said plunger is a generally square member dimensioned to slide within said guide channel.

8. The damper as defined in claim 1 wherein said plunger includes at least one aperture for captively holding a friction pad therein.

9. The damper as defined in claim 1 wherein said housing includes a second guide channel and said piston assembly includes a linear position sensor which extends into said second guide channel for providing electrical signals representing the damper motion.

10. The damper as defined in claim 9 wherein said linear position sensor comprises one of the group of inductive sensors, Hall effect sensors, optical sensors, capacitive sensors, and ultrasonic sensors.

11. The damper as defined in claim 1 wherein said friction pad is one of square, round, rectangular or oval and has a thickness greater than the thickness of said plunger.

12. The damper as defined in claim 1 wherein said housing and said piston assembly are integrally molded of a polymeric material.

13. The damper as defined in claim 1 wherein said friction pad is mounted in an aperture in said plunger to allow free movement of said plunger before said pad engages said wall of said guide channel to provide damping.

14. The damper as defined in claim 1 wherein said friction pad is made of a closed cell polyurethane material saturated with a lubricant.

15. A damper for a washing machine, said damper comprising:
   a housing having a longitudinal axis and an end cap with a central aperture for guidably receiving a control rod for said damper, said housing including a pair of spaced-apart guide channels offset from said longitudinal axis of said housing;
   a piston assembly including a piston at one end and a plunger extending therefrom and shaped to slideably fit within one of said guide channels of said housing;
   at least one friction pad mounted to said plunger to frictionally engage said guide channel of said housing;
   a control rod extending through said aperture in said end cap of said housing and attached to said piston; and
   a coil spring surrounding said housing and captively held between said end cap of said housing and said piston.

16. The damper as defined in claim 15 wherein said piston assembly includes a linear position sensor which extends into a second guide channel for providing electrical signals representing the damper motion.

17. The damper as defined in claim 16 wherein said linear position sensor comprises one of the group of inductive sensor, Hall effect sensors, optical sensors, capacitive sensors, and ultrasonic sensors.

18. The damper as defined in claim 15 wherein said friction pad is one of square, round, rectangular, polygonal, or oval and has a thickness greater than the thickness of said plunger.

19. The damper as defined in claim 15 wherein said housing and said piston assembly are integrally molded of a polymeric material.

20. The damper as defined in claim 15 wherein said friction pad is mounted in an aperture in said plunger to allow free movement of said plunger before said pad engages said guide channel to provide damping.

21. The damper as defined in claim 15 wherein said friction pad is made of a closed cell polyurethane material saturated with a lubricant.

22. A damper for a washing machine, said damper comprising:
   a molded polymeric housing having a longitudinal axis and an end cap with a central aperture for guidably receiving a control rod for said damper, said housing including a pair of spaced-apart guide channels offset from said longitudinal axis of said housing, wherein said guide channels are defined by pairs of spaced-apart walls extending in parallel relationship to said longitudinal axis of said housing;
   a molded polymeric piston assembly including a piston at one end and a generally flat rectangular plunger extending therefrom and shaped to slideably fit within one of said guide channels of said housing;
   a friction pad mounted to said plunger to frictionally engage said one guide channel of said housing;
   a control rod extending through said aperture in said end cap of said housing and attached to said piston; and
   a coil spring surrounding said housing and captively held between said end cap of said housing and said piston.

23. The damper as defined in claim 22 wherein said piston assembly includes a linear position sensor which extends into one of said guide channels for providing electrical signals representing the damper motion.

24. The damper as defined in claim 23 wherein said linear position sensor comprises one of the group of inductive sensors, Hall effect sensors, optical sensors, capacitive sensors, and ultrasonic sensors.

* * * * *

UNITED STATES PATENT AND TRADEMARK OFFICE
CERTIFICATE OF CORRECTION

PATENT NO. : 10,544,847 B2  
APPLICATION NO. : 15/746226  
DATED : January 28, 2020  
INVENTOR(S) : Michael Bauer et al.

Page 1 of 1

It is certified that error appears in the above-identified patent and that said Letters Patent is hereby corrected as shown below:

On the Title Page

Item (72) Inventors, Line 2, "Nuremberg" should be --Nurnberg--.

In the Specification

Column 1, Line 14, "PCT/US2016/0403078" should be --PCT/US2016/043078--.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*